Figure 1:
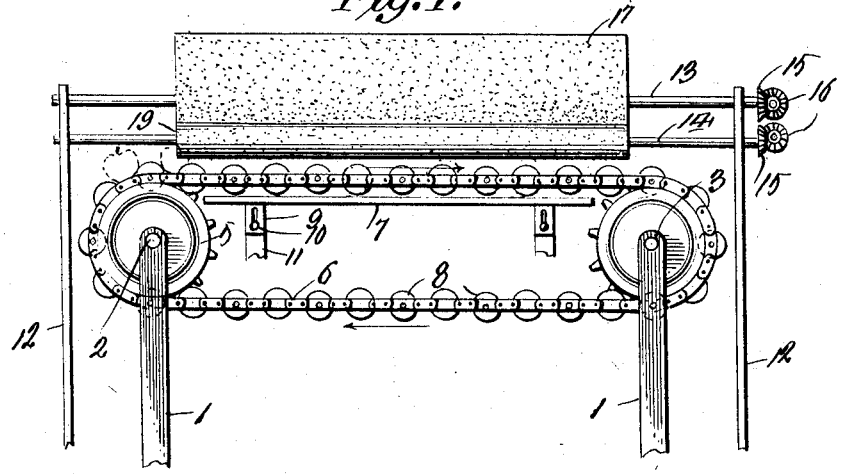

June 7, 1927.

H. T. DEMAREST 1,631,925

FRUIT SCRUBBER AND POLISHER

Filed Dec. 1, 1924   2 Sheets-Sheet 1

Inventor
HARRY T. DEMAREST

By Richard B. Owen
Attorney

WITNESSES

June 7, 1927.
H. T. DEMAREST
1,631,925
FRUIT SCRUBBER AND POLISHER
Filed Dec. 1, 1924
2 Sheets-Sheet 2
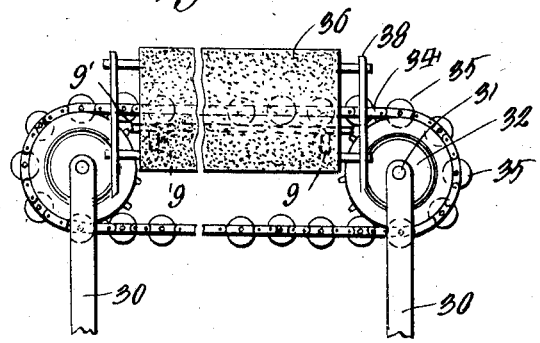
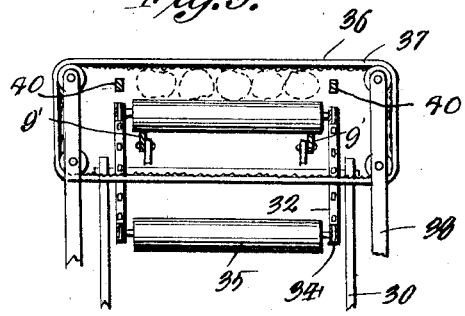
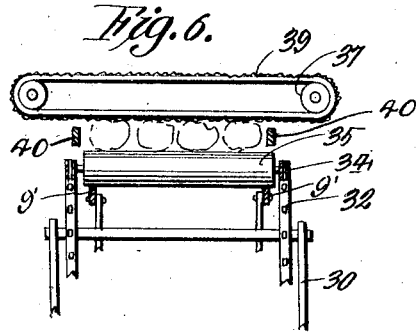
WITNESSES
Inventor
HARRY T. DEMAREST
By Richard B. Owen
Attorney Patented June 7, 1927.

1,631,925

UNITED STATES PATENT OFFICE.

HARRY T. DEMAREST, OF WARWICK, NEW YORK.

FRUIT SCRUBBER AND POLISHER.

Application filed December 1, 1924. Serial No. 753,332.

The present invention appertains to a fruit scrubber and polisher and has for its prime object to provide a simple and efficient machine of this nature which will be reliable in operation, inexpensive to manufacture, durable, and well adapted to the purpose for which it is designed.

Another important object of the invention is to provide a machine of this nature which will not in any way ruin the fruit during its operation and which will require practically no attention on the part of the operator.

With the above and numerous other objects in view as will appear as the description proceeds, the invention resides in certain novel features of construction, and in the combination and arrangement of parts as will be hereinafter more fully described and claimed.

Figure 2:
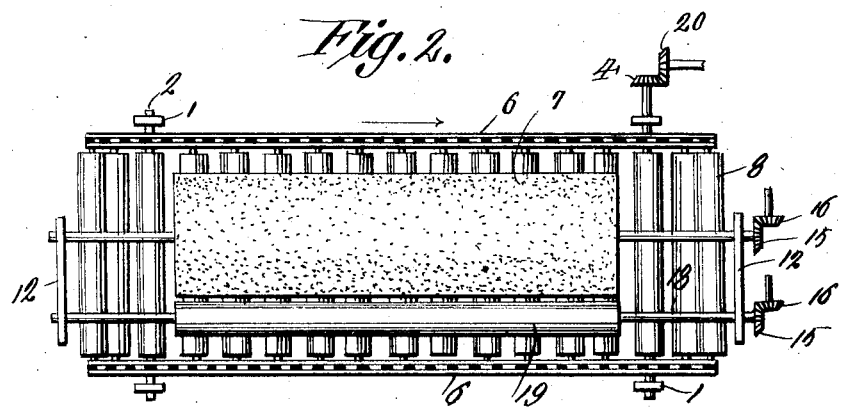
Figure 3:
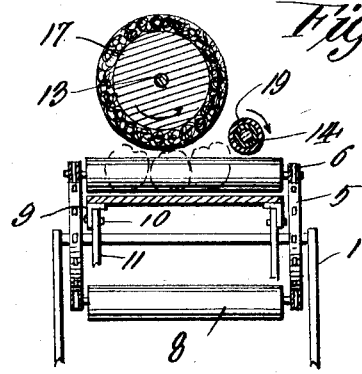

In the drawing:

Figure 1 is a side elevation of the apparatus embodying the features of my invention, Figure 2 is a top plan view thereof, Figure 3 is a transverse vertical section therethrough, Figure 4 is a side elevation of a modified form of the invention, Figure 5 is an end elevation thereof, and Figure 6 is a second modification of the invention in a transverse vertical section.

Referring to the drawing in detail and particularly the preferred form of the invention shown in Figures 1 to 3 of the drawing it will be seen that 1 designates standards which are arranged in pairs, one pair at each end of the apparatus The standards at their upper ends have journaled therein shafts 2 and 3, the latter being extended and provided at its end with a beveled gear 4. A conveying mechanism is trained over these shafts 2 and 3, sprocket wheels 5 being provided on the shafts for this purpose. Chains 6 are trained over the sprocket wheels so as to run parallel with each other one adjacent each edge of a platform 7. A plurality of rollers 8 or any type of cross bars are mounted between the chains 6 and are movable over the platform 7. The platform 7 is adjustable vertically being provided with the slotted brackets 9 for receiving bolts 10 mounted on standards 11. Standards 12 are mounted beyond standards 1 and have journaled therein shafts 13 and 14, the former above the latter and to one side thereof as will be evident from an inspection of Figure 3. These shafts 13 and 14 are provided at their ends with beveled gears 15 meshing with other beveled gears 16 which may be driven in any suitable manner for rotating the shafts. On the shaft 13 there is mounted an elongated polishing roller 17 while on the shaft 18 there is mounted a retaining roller 19 or, if preferred, a plain bar retainer may be used. These rollers are adapted to rotate in opposite directions to each other as indicated by the arrows in Figure 3. A bevel gear 20 is meshed with bevel gear 4 and is operated in any suitable manner for rotation of shaft 3 thus causing the movement of the conveyor including the plurality of rollers 8 or L-shaped cross bars occupying similar positions and over which a continuous strip of canvas cloth may, or may not be laid to completely cover the conveying platform. This conveyor moves in the direction indicated by the arrow in Figures 1 and 2 and the fruit will be fed from the left end thereby being moved along by the rollers and engaged by the polishing roller 17, the retaining roller preventing them from coming out of the machine or apparatus during its operation. The fruit will be turned all around during its movement across the platform 7 and will be efficiently polished. It is evident that in this modification I merely give an outline of the invention which is sufficient for those skilled in the art to readily appreciate and comprehend the nature of the invention and to build an operative device embodying its features.

The idea may be varied considerably as is evident from the modification shown in Figures 4, 5 and 6. Referring now particularly to the modification shown in Figures 4 and 5 it will be seen that 30 designates standards in which are journaled shafts 31 on which are mounted the sprocket wheels 32. The chains 34 are mounted on these sprocket wheels and support the rollers 35 which are disposed closer together than those shown in Figures 1, 2 and 3 thereby eliminating the necessity of providing a platform. Rollers will be dragged over rails 9', however, in order to cause fruit to revolve when placed upon them. This mechanism just described forms the conveyor for the fruit. The polishing mechanism consists of a polishing belt 36 which is trained over rollers 37. One run of this belt is disposed above the upper run of the rollers 35 and the other run extends between the two runs of the rollers. The rollers 37 are supported on suitable standards 38.

The modification shown in Figure 6 is identical with that just described except that the belt 39 is entirely above the conveying mechanism. The inside of the belt 36 is provided with the suitable polishing material while the outside of the belt 39 is provided with this material. Upon each side of the machine above the chains 34 suitable fruit retaining bars 40 may be positioned to prevent the fruit carried upon the conveyor rollers 35 from rolling off of the sides of the conveyor.

It will be apparent from the foregoing that I have devised a novel construction of a machine of this nature which will be effective under all conditions and which is not liable to readily get out of order. It will also be apparent that I have devised a novel and useful construction of a polisher which embodies the features of advantage enumerated as desirable in the statement of the invention and the above description, and while I have in the present instance shown and described the preferred embodiments of it which will give in practice satisfactory and reliable results, it is to be understood that the same is susceptible of modification in various particulars without departing from the spirit or scope of the invention as hereinafter claimed or sacrificing any of its advantages.

To wit, a plain weighted rug, or mat, or stationary brush may be used to bear down on the fruit over one of these rolling conveyor platforms described, and all of the other parts of the polisher mechanism may be entirely dispensed with and a slight polish will be imparted to a greater, or less, portion of the surface of the fruit passing under it, although the polish will tend to be imparted in the shape of a ring over only one part of the fruit rather than over the whole surface (as will be done in the machines described above) unless deflecting rods be used to cause some sidewise motion of the fruit as well as that in the straight forward motion alone imparted to it by the conveyor mechanism.

Having thus described my invention, what I claim as new is:

1. A fruit scrubber and polisher including a longitudinal substantially horizontal endless conveyor, embodying transverse freely rotatable fruit supporting rollers, stationary means mounted beneath the upper run of the conveyor on to which said rollers are adapted to ride for causing rotation of the rollers and sustaining the latter when supporting the fruit, means to actuate said conveyor, polishing means above the upper run of said conveyor to engage the tops of the fruit, and means associated with said polishing means to cause lateral turning of the fruit while being moved longitudinally by the conveyor.

2. A fruit scrubber and polisher comprising a longitudinal substantially horizontal endless conveyor, embodying transverse freely rotatable fruit supporting rollers, a vertically adjustable stationary means mounted beneath the upper run of the conveyor onto which said rollers are adapted to ride causing a rotation of the rollers in the direction of longitudinal movement thereof and sustaining the latter when supporting the fruit, means to actuate said conveyor, polishing means above the upper run of the conveyor to engage the tops of the fruit, and means associated with said polisher to cause lateral turning of the fruit while the same is being moved longitudinally by the conveyor.

3. A fruit scrubber and polisher of the character described, comprising substantially horizontal endless conveyor embodying transverse freely rotatable fruit supporting rollers, stationary means mounted beneath the upper run of the conveyor onto which said rollers are adapted to ride causing rotation of the same and sustaining the rollers when supporting the fruit, means to actuate said conveyor, polishing means above the upper run of the conveyor to engage the tops of the fruit and means operating in unison with said polishing means to cause lateral turning of the fruit while the same is moving longitudinally by the conveyor, said stationary means embodying a platform arranged to be engaged by the fruit supporting rollers.

4. A fruit scrubber and polisher of the character described comprising a substantially horizontal endless conveyor embodying transverse freely rotatable fruit supporting rollers, means to actuate said conveyor, a pair of shafts supported for and extending longitudinally of said conveyor, an elongated cylindrical brush carried upon and adapted to revolve with one of said shafts and arranged to engage the tops of fruit carried upon said conveyor for brushing the same transversely to their line of movement, a relatively small retaining roller carried by the other said shaft and arranged adjacent to and in the same plane with a lowermost portion of said brush to prevent fruit from being pushed from said conveyor by the brush and means for rotating said brush and retaining roller in opposite directions.

In testimony whereof I affix my signature.

HARRY T. DEMAREST.